United States Patent
Orlov et al.

(10) Patent No.: US 10,604,225 B2
(45) Date of Patent: Mar. 31, 2020

(54) PRESSURE BULKHEAD ADAPTED TO NON-CIRCULAR FUSELAGE SECTION

(71) Applicant: Airbus Operations GmbH, Hamburg (DE)

(72) Inventors: Dimitri Orlov, Tornesch (DE); Dirk Richter, Hamburg (DE); Memis Tiryaki, Jork (DE); Ralf Reinhold, Pinneberg (DE); Wolfgang Eilken, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 847 days.

(21) Appl. No.: 15/060,879

(22) Filed: Mar. 4, 2016

(65) Prior Publication Data

US 2016/0257393 A1    Sep. 8, 2016

(30) Foreign Application Priority Data

Mar. 6, 2015 (EP) .................................. 15158037

(51) Int. Cl.
*B64C 1/10* (2006.01)
(52) U.S. Cl.
CPC ...................... *B64C 1/10* (2013.01)
(58) Field of Classification Search
CPC .. B64C 1/10; B64C 1/069; B63B 3/34; B63B 3/26; B63B 3/14; B63B 19/12; B63B 19/14; B63B 2019/145; B63B 19/22; B63G 8/40; B63G 2008/403; B63G 2008/408; B63G 8/41
See application file for complete search history.

(56) References Cited

U.S. PATENT DOCUMENTS

| | | | |
|---|---|---|---|
| 5,062,589 A * | 11/1991 | Roth | B64C 1/10 244/117 R |
| 5,086,996 A | 2/1992 | Roeder et al. | |
| 5,441,005 A * | 8/1995 | Freeman | B63B 19/00 114/117 |
| 5,934,616 A | 8/1999 | Reimers et al. | |
| 6,213,426 B1 * | 4/2001 | Weber | B64C 1/10 244/117 R |
| 6,378,805 B1 * | 4/2002 | Stephan | B64C 1/10 244/117 R |

(Continued)

OTHER PUBLICATIONS

Dictionary.com, "semispheric"; https://www.dictionary.com/browse/semisphere; accessed May 3, 2019 (Year: 2019).*

*Primary Examiner* — Philip J Bonzell
*Assistant Examiner* — Alexander V. Giczy
(74) *Attorney, Agent, or Firm* — Lorenz & Korf LLP

(57) ABSTRACT

A fuselage section of an aircraft has an inner surface with a non-circular contour. A pressure bulkhead for use in the fuselage section has a non-circular outer edge that is aligned with the non-circular contour of the inner surface of the fuselage section. The pressure bulkhead has a spherically-shaped inner section having radially arranged stiffening units and a non-spherically outer section having additional radially arranged stiffening units; the stiffening units corresponding to each section do no extend into the other section. The pressure bulkhead is attached to the fuselage section. A method of manufacturing a fuselage section having such a pressure bulkhead is also provided.

8 Claims, 4 Drawing Sheets

(56) References Cited

U.S. PATENT DOCUMENTS

| | | | |
|---|---|---|---|
| 8,033,503 B2* | 10/2011 | Basso | B64C 1/10 |
| | | | 244/119 |
| 8,226,870 B2* | 7/2012 | Garcia Laja | B64C 1/10 |
| | | | 264/238 |
| 8,444,089 B2* | 5/2013 | Mischereit | B64C 1/10 |
| | | | 244/118.5 |
| 8,596,578 B2 | 12/2013 | Noebel et al. | |
| 8,939,404 B2 | 1/2015 | Sayilgan et al. | |
| 10,384,759 B2* | 8/2019 | Zuardy | B64C 1/064 |
| 2001/0025903 A1 | 10/2001 | Weber et al. | |
| 2007/0164152 A1* | 7/2007 | Anderson | B64C 1/10 |
| | | | 244/118.1 |
| 2008/0149769 A1* | 6/2008 | Koch | B64C 1/062 |
| | | | 244/121 |
| 2010/0243806 A1* | 9/2010 | Vera Villares | B64C 1/10 |
| | | | 244/119 |
| 2011/0179626 A1 | 7/2011 | Weber et al. | |
| 2011/0233334 A1* | 9/2011 | Stephan | B64C 1/10 |
| | | | 244/119 |
| 2012/0186062 A1* | 7/2012 | Vera Villares | B64C 1/069 |
| | | | 29/428 |
| 2013/0266770 A1 | 10/2013 | Otto et al. | |
| 2014/0054419 A1* | 2/2014 | Grase | B64C 1/10 |
| | | | 244/121 |
| 2014/0370227 A1* | 12/2014 | Diep | B64D 45/00 |
| | | | 428/66.4 |
| 2019/0031314 A1* | 1/2019 | Seack | B64C 1/064 |

* cited by examiner

PRESSURE BULKHEAD ADAPTED TO NON-CIRCULAR FUSELAGE SECTION

CROSS-REFERENCE TO RELATED APPLICATION

This application claims priority of European Patent Application No. 15 158 037.0 filed on Mar. 6, 2015, which is incorporated herein by reference in its entirety.

TECHNICAL FIELD

The embodiments described herein relate to the manufacturing of fuselages for vehicles. In particular, the embodiments relate to a fuselage section, to an aircraft, and to a method for manufacturing a fuselage section.

BACKGROUND

Nowadays, aircraft, especially modern passenger aircraft, comprise a pressurized cabin area as well as a non-pressurized area within the aircraft. Therefore, a so-called pressure bulkhead forms a barrier between the pressurized area of the fuselage and the non-pressurized area of the fuselage. Such pressure bulkheads comprise a spherical shape in order to effectively transmit the pressure loads which are due to the pressure difference between the pressurized cabin area and the non-pressurized area of the fuselage. The integration of such a pressure bulkhead also requires the installation of several attachment parts via which the pressure loads acting on the pressure bulkhead are transmitted into the fuselage section, e.g. the outer skin or the primary structure of the aircraft. Since the outer edge of the pressure bulkhead has a circular shape and the fuselage section usually has a non-circular shape, a gap between the outer edge of the pressure bulkhead and the non-circular fuselage section has to be closed by special formed parts.

U.S. Pat. No. 8,596,578 B2 describes a pressure bulkhead for a fuselage of an aircraft which is configured for bounding a fuselage interior relative to an external environment. The pressure bulkhead includes a flat skin configured to span a cross-section of the fuselage and having a cavity disposed at a core region of the skin. The core region is radially bounded by a ring element.

U.S. Pat. No. 8,939,404 B2 describes a pressure fuselage of an aircraft, which fuselage in a longitudinal direction comprises several fuselage sections, wherein at least one rear dome-shaped pressure bulkhead is provided to form an aircraft-internal pressurized region, with a ring-shaped frame element profile being provided for radially outward attachment of the dome-shaped pressure bulkhead to at least one fuselage section.

SUMMARY

It is an object of the present embodiment to reduce the number of required parts for manufacturing a fuselage section.

According to a first aspect of the present embodiment, a fuselage section is provided. The fuselage section comprises an inner surface with a non-circular contour. The fuselage section further comprises a pressure bulkhead comprising a non-circular outer edge. The non-circular outer edge of the pressure bulkhead is aligned with the non-circular contour of the inner surface of the fuselage section when the pressure bulkhead is attached to the fuselage section.

In particular, the non-circular outer edge of the pressure bulkhead is aligned with the non-circular contour of the inner surface of the fuselage section such that the outer edge of the pressure bulkhead follows or extends substantially parallel to the inner surface of the fuselage section when the pressure bulkhead is attached to the fuselage section.

In other words, the fuselage section, which may be considered as a substantially tube-like element, has a non-circular contour, for example in a cross-sectional view, wherein the cross-sectional view is based on a viewing direction into a longitudinal direction or along a longitudinal axis of the fuselage section. This means that the fuselage section is for example elongated in a vertical direction and therefore not circular in a cross-sectional view.

Providing a pressure bulkhead with a non-circular outer edge, which non-circular outer edge is similar or equal to the non-circular contour of the inner surface of the fuselage section, makes it possible to integrate the pressure bulkhead into the fuselage section such that no other parts which connect the pressure bulkhead to the fuselage section and therefore close a gap between the pressure bulkhead and the fuselage section are needed. In other words, the pressure bulkhead, which may be spherical in its shape, is extended such that the non-circular outer edge of the pressure bulkhead may be directly attached to on the inner contour of the fuselage section.

In other words, the non-circular outer edge of the pressure bulkhead, which pressure bulkhead may be a one piece component, is aligned with a non-circular contour of the inner surface of the fuselage section and therefore the outer edge of the pressure bulkhead follows or extends parallel to the inner surface of the fuselage section, for example in a perpendicular direction with respect to the longitudinal axis of the fuselage section when the pressure bulkhead is attached to the fuselage section. In this manner, it is not necessary that the pressure bulkhead, which conventionally has a circular outer edge, has to be connected to the non-circular inner surface of the fuselage section by a separate part. This means that according to the embodiment, a one piece pressure bulkhead which may only partly be spherical in its shape may be directly connected to the inner surface of the fuselage section which itself has a non-circular contour with respect to a viewing direction into the longitudinal axis of the aircraft. However, there may be a small gap between the pressure bulkhead and the non-circular contour of the inner surface of the fuselage section but this gap may be constant in its thickness, e.g. the distance between the outer edge of the pressure bulkhead and the inner surface of the fuselage section may be constant along a curve which extends on the inner surface perpendicular to the longitudinal axis of the fuselage section.

The fact that the non-circular outer edge of the pressure bulkhead is aligned with the non-circular contour of the inner surface of the fuselage section means that the non-circular outer edge and a curve on the non-circular contour of the inner surface, which curve is perpendicular to the longitudinal axis, extend as parallel curves around the longitudinal axis of the aircraft. In other words, the alignment of the non-circular outer edge and the non-circular contour of the inner surface of the fuselage section may be imagined as parallel curves extending within the fuselage section. It is possible that the outer edge of the pressure bulkhead which is aligned to the non-circular contour of the inner surface of the fuselage section may be congruent, e.g. the outer edge contacts the non-circular contour of the inner surface.

However, it may also be possible that the outer edge and the non-circular contour may be separated by a predetermined distance. However, both the non-circular outer edge of the pressure bulkhead and the non-circular contour of the inner surface of the fuselage section are substantially provided as parallel curves extending around and/or perpendicular to the longitudinal direction or the longitudinal axis of the fuselage section. It should be mentioned that a parallel of a curve may be the envelope of a family of congruent circles centered on the curve. Therefore, the parallel curve may be defined as a curve whose points are at a fixed normal distance of a given curve. The parallel curve may also be called an offset curve. The non-circular contour of the inner surface may be defined by a curve on the inner surface of the fuselage section, which curve may extend perpendicular to the longitudinal axis of the fuselage section. In other words, the curve represents the non-circular inner surface of the fuselage section and may therefore lie in a virtual plane perpendicular to the longitudinal axis of the fuselage section. Therefore, the outer edge of the pressure bulkhead may also lie in this virtual plane.

The pressure bulkhead may be manufactured from one piece. For example the pressure bulkhead is manufactured of a composite material and/or comprises a fibre reinforced material. Since the pressure bulkhead has an outer edge which is aligned with a non-circular contour on the inner surface of the fuselage section, the pressure bulkhead is not completely spherical in its shape. In other words, the outer edge of the pressure bulkhead is adapted to the inner shape of the fuselage section such that the pressure bulkhead may be imagined as a pressure-optimized component with a non-spherical shape. The pressure bulkhead may thus be considered as being adapted to the non-circular fuselage section.

However, it may be possible that a part of the pressure bulkhead has a spherical shape whereas an extended part of the pressure bulkhead, which comprises the outer edge of the pressure bulkhead, is non-spherical in its shape. The pressure bulkhead is a shell-like structural component and may be defined by free form surfaces. The pressure bulkhead is adapted to effectively transmit or carry pressure loads which are due to a pressure difference between a pressurized cabin area and a non-pressurized outer area of the fuselage section. For example the pressure bulkhead is a rear pressure bulkhead of an aircraft.

Using such a pressure bulkhead which, regarding the shape, is adapted to the inner contour of the fuselage section provides the possibility to reduce parts required for fastening the pressure bulkhead to the fuselage section as well as closing the gap between a spherical pressure bulkhead and the fuselage section. For example, parts like so-called shear webs and y-cords are not needed. The loads from the pressure dome, e.g. the pressure bulkhead, are transferred into the fuselage section more directly and in a more tangentially way. The fuselage section may comprise the fuselage skin such that the loads from the pressure bulkhead are directly transferred into the fuselage skin of the fuselage section. The loads can be transmitted more effectively since a frame at the pressure bulkhead position is not needed to fill the gap between the pressure bulkhead and the fuselage section, e.g. fuselage skin. Moreover, such a frame is not needed since the transfer of the pressure loads are directly introduced from the pressure bulkhead into the skin of the fuselage section. Therefore, the frame which is located at the pressure bulkhead may be sized as a typical small frame which is usually applied to fuselage sections since the function of this frame of filling the gap between the outer edge of the pressure bulkhead and the inner surface of the fuselage section is not necessary.

According to an embodiment, the inner surface of the fuselage section is aligned with the outer edge of the pressure bulkhead such that a substantially constant distance between the inner surface of the fuselage section and the outer edge of the pressure bulkhead is provided.

In particular, the inner surface of the fuselage section is aligned with or parallel to the outer edge of the pressure bulkhead such that a constant distance between the inner surface of the fuselage section and the outer edge of the pressure bulkhead is provided. In other words, the distance between the outer edge and the non-circular contour of the inner surface is constant or comprises an average value from which a local distance deviates only due to manufacturing tolerances. These tolerance deviations may only be a few micrometers or millimetres such that the gap between the outer edge of the pressure bulkhead and the non-circular inner surface of the fuselage section may be considered as constant in its thickness. Therein, the distance and/or thickness is measured in a perpendicular direction with respect to the longitudinal axis of the fuselage section. That means that the distance between the non-circular outer edge and the non-circular inner surface is substantially constant and therefore has a substantially constant value which deviates only by means of a few micrometers or millimetres due to tolerance reasons. That is, it may be considered that the non-circular outer edge of the pressure bulkhead and the non-circular inner surface of the fuselage section are aligned such that a first curve which indicates the contour of the outer edge of the pressure bulkhead and a second curve which indicates the non-circular contour of the inner surface of the fuselage section may be parallel curves or offset curves wherein the offset between the curves is defined as the distance between both curves. Therein, the first curve and the second curve, e.g. the outer edge of the pressure bulkhead, and the non-circular contour of the inner surface are arranged perpendicular to the longitudinal axis of the fuselage section. Both first and second curve may lie in a virtual plane which is perpendicular to the longitudinal axis of the fuselage section.

According to another embodiment, the fuselage section further comprises an attachment unit. The attachment unit comprises a profile which extends on the non-circular inner surface of the fuselage section along at least a part of a curve which is perpendicular to a longitudinal axis of the fuselage section such that the non-circular outer edge of the pressure bulkhead is aligned with the curve along which the profile extends.

The attachment unit may be adapted to attach the pressure bulkhead to the inner surface of the fuselage section. For example, the profile is a connection angle which connects the pressure bulkhead to the fuselage section and therefore transmits the pressure loads acting on the pressure bulkhead to the fuselage section. The curve may be imagined as a curve which is directly located on the non-circular inner surface of the fuselage section. However, the curve may be an imagined curve along which the profile extends perpendicular to the longitudinal axis of the fuselage section. The longitudinal axis of the fuselage section may be also a longitudinal axis of an aircraft to be assembled by means of the fuselage section and for example further fuselage sections. The attachment unit may further comprise attachment elements, like for example screws, rivets or bolts which connect the pressure bulkhead to the attachment unit and which connect the attachment unit to the fuselage section such that the pressure bulkhead may be attachment and/or connected to the fuselage section by means of the attachment unit, e.g. the profile.

According to another embodiment, the profile comprises a constant cross-section along the curve. For example, the profile may have a constant thickness or height. In particular, a cross sectional area of the profile may be constant, wherein the profile extends along the inner surface of the fuselage section. The height or thickness of the profile may be measured perpendicular to the direction into which the profile extends.

The profile may have a constant cross-section since the gap to be closed between the outer edge of the pressure bulkhead and the inner surface of the fuselage section is also substantially constant. In other words, the frame which connects the outer edge of a spherical pressure bulkhead to the non-circular inner surface of the fuselage section may be designed as a profile with constant thickness.

According to an embodiment, the profile comprises a first flange being attached to the pressure bulkhead and a second flange being attached to the inner surface of the fuselage section.

In this manner, the pressure bulkhead may be attached to the inner surface of the fuselage section by means of the profile. The respective flanges may be attached to the pressure bulkhead or to the inner surface of the fuselage section by means of connecting elements, like for example screws, rivets, bolts or other connecting or bonding elements. The profile may be a connection angle such that the first flange and the second flange are inclined to each other by a predetermined angle. The first flange and the second flange may enclose an obtuse angle. It should be mentioned that the cross-section of the profile is identified as a cut through the profile perpendicular to the curve extending on the non-circular inner surface of the fuselage section wherein the curve extends perpendicular to the longitudinal axis of the fuselage section.

According to another embodiment, the fuselage section further comprises a plurality of profiles. Therein, each of the profiles extends at least along a part of the curve such that the plurality of profiles together form a fastening means which fastening means is aligned with a non-circular inner surface of the fuselage section.

The fastening means may be a frame or frame-like element which encloses the longitudinal axis of the fuselage section since the frame extends along the curve on the inner surface of the fuselage section which curve may be directly located on the inner surface of the fuselage section and therefore may be a non-circular curve. In other words, the plurality of profiles together provide an extrusion along the curve within the fuselage section, e.g. along the non-circular inner surface of the fuselage section. The fastening means, e.g. the frame extends around the longitudinal axis of the fuselage section. In particular, the plurality of profiles together provide an extrusion which is perpendicular to the longitudinal axis of the fuselage section. Furthermore, the plurality of profiles are arranged so as to close the gap, e.g. the constant distance between the outer edge of the pressure bulkhead and the inner surface of the fuselage section.

According to an embodiment, the pressure bulkhead is attached to the inner surface of the fuselage section via the attachment unit.

For example, the attachment unit attaches the pressure bulkhead to the inner surface of the fuselage section such that pressure loads acting on the pressure bulkhead may be transmitted through the attachment unit into the fuselage section and thereby into an aircraft structure, e.g. into an aircraft primary structure. Moreover, the attachment unit may be located in a region of the outer edge of the pressure bulkhead such that the pressure bulkhead is attached to the attachment unit in the region of the outer edge of the pressure bulkhead.

According to a embodiment, the pressure bulkhead comprises a spherical component which is stiffened by means of stiffening units.

The stiffening units may be adapted such that pressure loads acting on the pressure bulkhead may be effectively transmitted through the pressure bulkhead to the region of the outer edge of the pressure bulkhead and then into the fuselage section via the attachment unit.

According to a embodiment, the stiffening units of the pressure bulkhead are radially arranged with respect to a longitudinal axis of the fuselage section.

In this manner, an optimized load transmission within the pressure bulkhead can be achieved. The stiffening units may be arranged such that they only extend on the spherical component of the pressure bulkhead and therefore only cover a part of the pressure bulkhead.

According to yet another embodiment, the pressure bulkhead further comprises a shell-like structural component which comprises the non-circular outer edge of the pressure bulkhead.

The shell-like structural component may be attached and/or connected to the spherical component of the pressure bulkhead such that a transition area between the spherical component and the shell-like structural component of the pressure bulkhead is provided. The shell-like structural component may have a shape which differs from a spherical shape. For example, the shell-like structural component may be adapted to connect the outer edge of the pressure bulkhead to the spherical component of the pressure bulkhead in order to provide a transition between the spherical component of the pressure bulkhead and the non-circular contour of the inner surface of the fuselage section.

According to another embodiment, the shell-like structural component circumscribes the spherical component such that the shell-like structural component and the spherical component together form the pressure bulkhead.

The pressure bulkhead which comprises the shell-like structural component and the spherical component may be connected such that both parts of the pressure bulkhead form a unity and such that the pressure bulkhead is made of one piece. The pressure bulkhead may be a pressure optimized form comprising free form surfaces wherein a part of the free form surface comprises a spherical component and another part of the free form surface comprises a non-spherical component, for example with an irregular shape.

According to an embodiment, the shell-like structural component of the pressure bulkhead provides a means for joining the pressure bulkhead to the inner surface of the fuselage section by means of the attachment unit.

In other words, the shell-like structural component comprises the outer edge of the pressure bulkhead which is non-circular such that the whole pressure bulkhead which may be a one piece pressure bulkhead may be attached via the attachment unit to the fuselage section. Therein, the attachment unit may be located in a region of the outer edge of the pressure bulkhead and therefore at the shell-like structural component of the pressure bulkhead.

According to yet another embodiment, the shell-like structural component and the spherical component are manufactured by means of integral construction.

In this manner, a one piece pressure bulkhead may be manufactured. The pressure bulkhead may be manufactured or designed so as to effectively transmit pressure loads to the fuselage section. Therefore, the pressure bulkhead may comprise a pressure optimized form or shape.

According to another embodiment, the shell-like structural component and/or the spherical component are manufactured from a material selected from a group the group comprising a composite material, a fiber-reinforced material and a carbon fiber-reinforced material.

However, it is preferred that the pressure bulkhead including the shell-like structural component which is non-spherical and the spherical component are manufactured from one piece. Preferably, the pressure bulkhead is manufactured of carbon fibre-reinforced plastics.

According to an aspect, an aircraft comprising a fuselage as described above is provided.

According to another aspect, a method for manufacturing a fuselage section is provided. In a first step, an inner surface with a non-circular contour of the fuselage section is provided. In a second step, a pressure bulkhead comprising a non-circular outer edge is provided. In another step of the method, the non-circular outer edge of the pressure bulkhead is aligned with the non-circular contour of the inner surface of the fuselage section. In another step, the pressure bulkhead is attached to the fuselage section.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
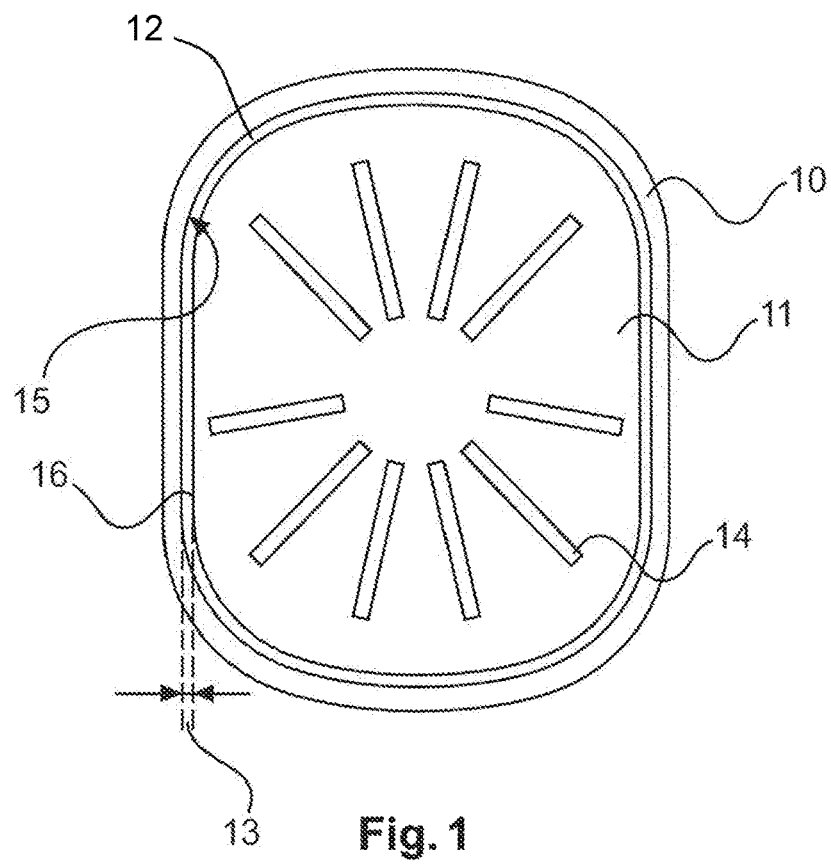
FIG. 1 shows a cross-sectional view of a fuselage section comprising an inner surface with a non-circular contour and a pressure bulkhead comprising a non-circular outer edge according to an embodiment.

FIG. 1 shows a cross-sectional view of a fuselage section 10 with a non-circular inner surface 15 and a pressure bulkhead 11 with a non-circular outer edge 16. The non-circular outer edge 16 of the pressure bulkhead 11 is aligned with the non-circular inner surface 15 of the fuselage section 10. There may be a gap 12 between the non-circular inner surface 15 of the fuselage section 10 and the non-circular outer edge 16 of the pressure bulkhead 11. However, the gap may be constant in its thickness. In other words, a distance 13 between the outer edge 16 of the pressure bulkhead 11 and the inner surface 15 of the fuselage section 10 is substantially constant along the outer edge 16 or the inner surface 15. The cross-sectional view shown in FIG. 1 may be a cut through the fuselage section 10 perpendicular to a longitudinal axis of the fuselage section 10. The pressure bulkhead 11 may comprise stiffening units 14 which stiffen the shell-like pressure bulkhead 11 such that the loads which are due to a pressure difference between a cabin area and an outer area of the fuselage section 10 can be transmitted into the fuselage section 10. In other words, the pressure bulkhead 11 separates a pressurized cabin area of the fuselage section 10 and a non-pressurized area of the fuselage section 10.

The distance 13 between the non-circular outer edge 16 of the pressure bulkhead 11 and the non-circular inner surface 15 of the fuselage section 10 may be substantially constant such that the non-circular outer edge 16 and the non-circular contour of the inner surface 15 provide parallel curves wherein the offset of said parallel curves is defined by the distance 13. Providing a pressure bulkhead 11 comprising a non-circular outer edge 16 which is aligned to the non-circular inner surface 15 of the fuselage section 10 is advantageous because frames or other elements which connect the pressure bulkhead 11 to the fuselage section 10 are not needed or may have a constant cross section. In particular, the pressure bulkhead 11 shown in FIG. 1 shows a possibility to adapt the shape of the pressure bulkhead 11 to the contour of the fuselage section 10 which is usually non-circular in its cross-section. However, this configuration is advantageous in contrast to conventional pressure bulkheads which are spherically formed and which need a further part connecting the spherically formed pressure bulkhead and therefore the outer edge of the pressure bulkhead to the fuselage section, thus providing the means for bridging the gap between the circular outer edge of conventional pressure bulkheads to the non-circular inner surface of the fuselage section.

Figure 2:
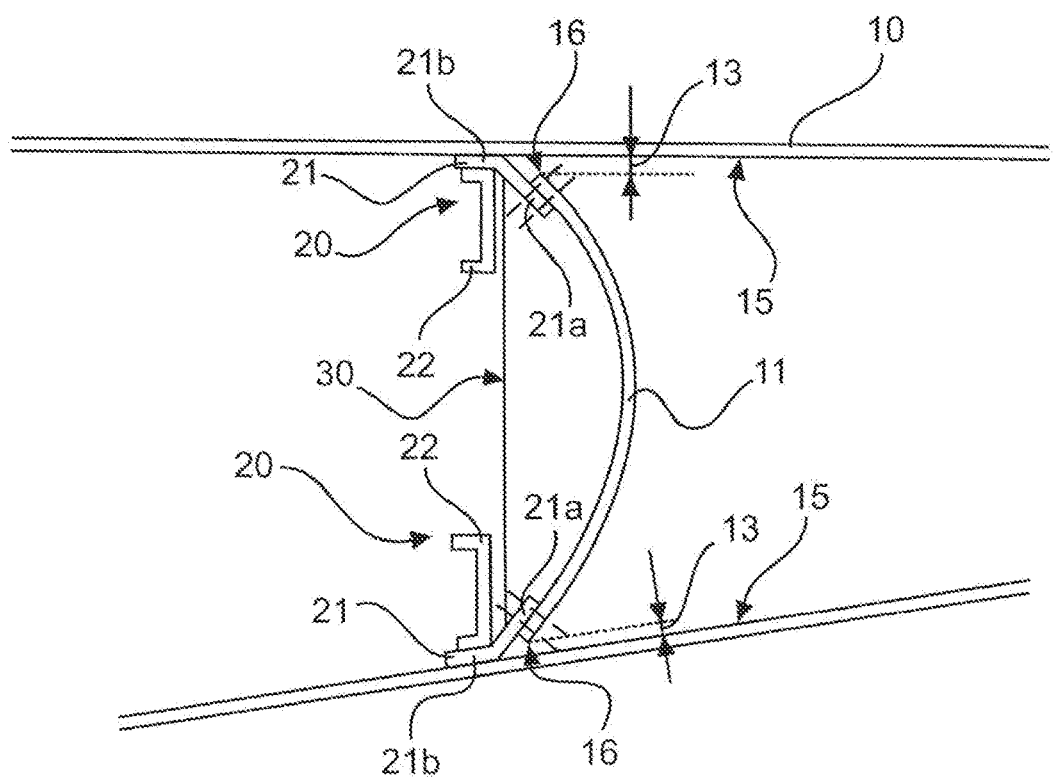
FIG. 2 shows a sectional view of a fuselage section and a pressure bulkhead according to an embodiment.

FIG. 2 shows a sectional view of a fuselage section 10 and a pressure bulkhead 11 which pressure bulkhead 11 is attached to the fuselage section 10 by means of an attachment unit 20. The attachment unit 20 may comprise a profile 21 in the form of a connection angle. The profile may therefore comprise a first flange 21a which is attached to the pressure bulkhead 11 as well as a second flange 21b which is attached to the fuselage section 10, e.g. the inner surface 15 of the fuselage section 10. The attachment of the pressure bulkhead 11 to the first flange 21a may be provided by means of connecting elements like for example screws, bolts, rivets, etc. The attachment of the fuselage section 10 to the second flange 21b may also be provided by connection elements, like for example screws, joints or rivets. There may be a gap 13 between the outer edge 16 of the pressure bulkhead 11 and the inner surface 15 of the fuselage section 10. The gap 13 may be constant in its thickness when extending along the non-circular inner surface 15 of the fuselage section, for example along a curve 30 which is directly located on the inner surface of the fuselage section and/or which is perpendicular to a longitudinal axis of the fuselage section.

It should be mentioned that the profile 21 as well as the attachment unit 20 may also be aligned with the non-circular inner surface 15 of the fuselage section 10 and/or the curve 30. The profile 21 may comprise a constant cross section when extending along the inner surface of the fuselage section and/or along the curve 30.

Figure 3:
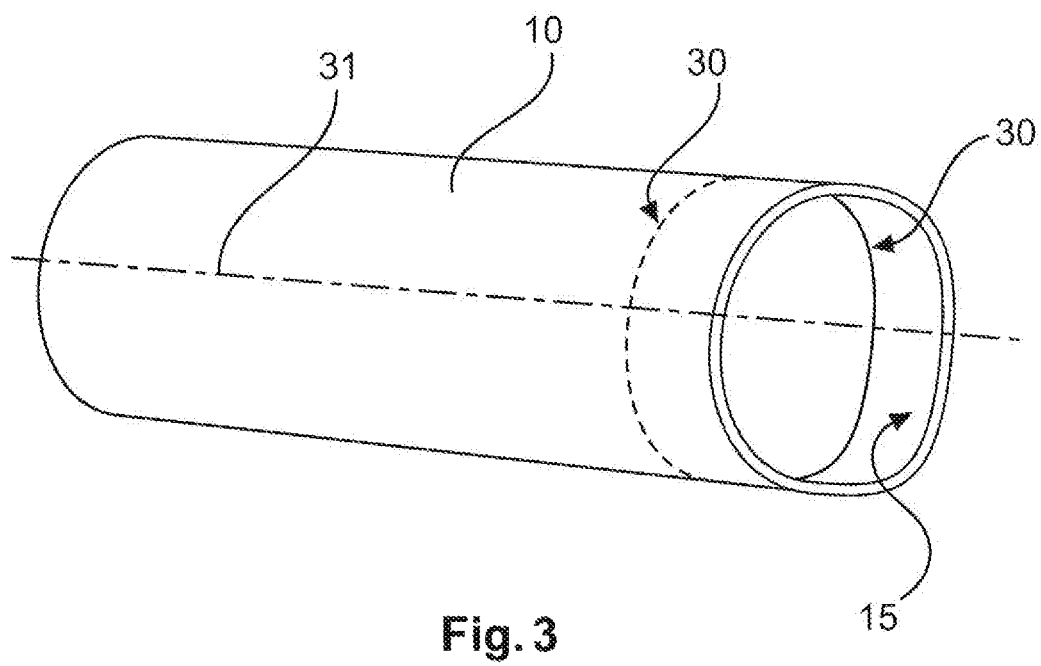
FIG. 3 shows a perspective view of a fuselage section according to an embodiment.

FIG. 3 shows a perspective view of a fuselage section 10 showing the curve 30 which is directly located on the inner surface 15 of the fuselage section 10 which inner surface 15 is non-circular with respect to a cross-sectional view of the fuselage section 10. The curve 30 with which the outer edge 16 of the pressure bulkhead 11 is aligned and/or with which the profile 21 is aligned when extending on the inner surface 15 of the fuselage section 10 may be perpendicular to a longitudinal axis 31 of the fuselage section 10. The longitudinal axis 31 of the fuselage section 10 may be parallel or congruent to a longitudinal axis of an aircraft fuselage.

Figure 4:
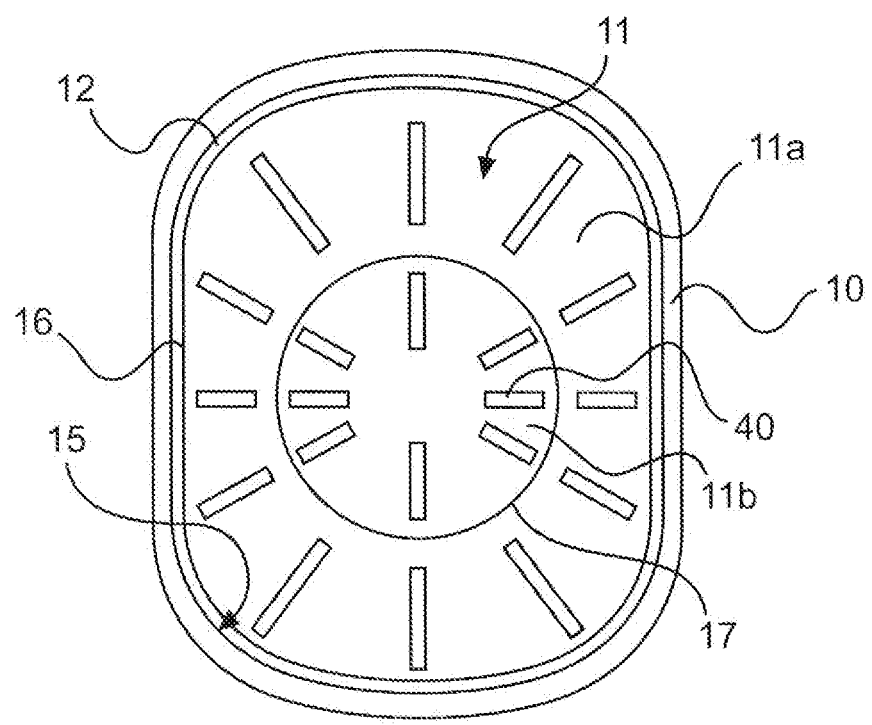
FIG. 4 shows a cross-sectional view of a fuselage section with a non-circular inner surface and a pressure bulkhead with a spherical component and a shell-like structural component according to an embodiment.

FIG. 4 shows a cross-sectional view of a fuselage section 10 with a non-circular inner surface 15 and a pressure bulkhead 11 with a non-circular outer edge 16 wherein the non-circular outer edge 16 of the pressure bulkhead 11 is aligned with or follows the non-circular contour of the inner surface 15. The pressure bulkhead 11 comprises a spherical component 11b and a shell-like structural component 11a which circumscribes the spherical component 11b and also connects the spherical component 11b to the fuselage section 10 by means of an attachment unit 20 which is not shown in FIG. 4. The spherical component 11b of the pressure bulkhead 11 may comprise a circular outer edge 17 which is circumscribed by the shell-like structural component 11a of the pressure bulkhead 11. The shell-like structural component may be a non-circular component with respect to a cross-sectional view shown in FIG. 4. The shell-like structural component 11a may rather be a transition region connecting the spherical component 11b of the pressure bulkhead 11 to the fuselage section 10 by means of the attachment unit 20. For example, the spherical component 11b of the pressure bulkhead comprises further stiffening units 40 adapted for receiving pressure loads acting on the surface of the pressure bulkhead 11, e.g. the spherical component 11b of the pressure bulkhead 11. The gap 12 may have a constant thickness or distance which may be sealed with a sealing unit in combination with the profile 21 such that the pressure bulkhead 11 provides a barrier between a pressurized cabin area of the fuselage section 10 and a non-pressurized area of the fuselage section 10. For example, the pressure bulkhead 11 shown in FIG. 4 may be integrated into the fuselage section shown in FIG. 3 such that the outer edge 16 of the pressure bulkhead 11 which is non-circular fits into the fuselage section 10 and therefore aligns the curve 30 which is placed on the inner surface 15 of the fuselage section 10 and which is perpendicular to the longitudinal axis 31 of the fuselage section 10.

Figure 5:
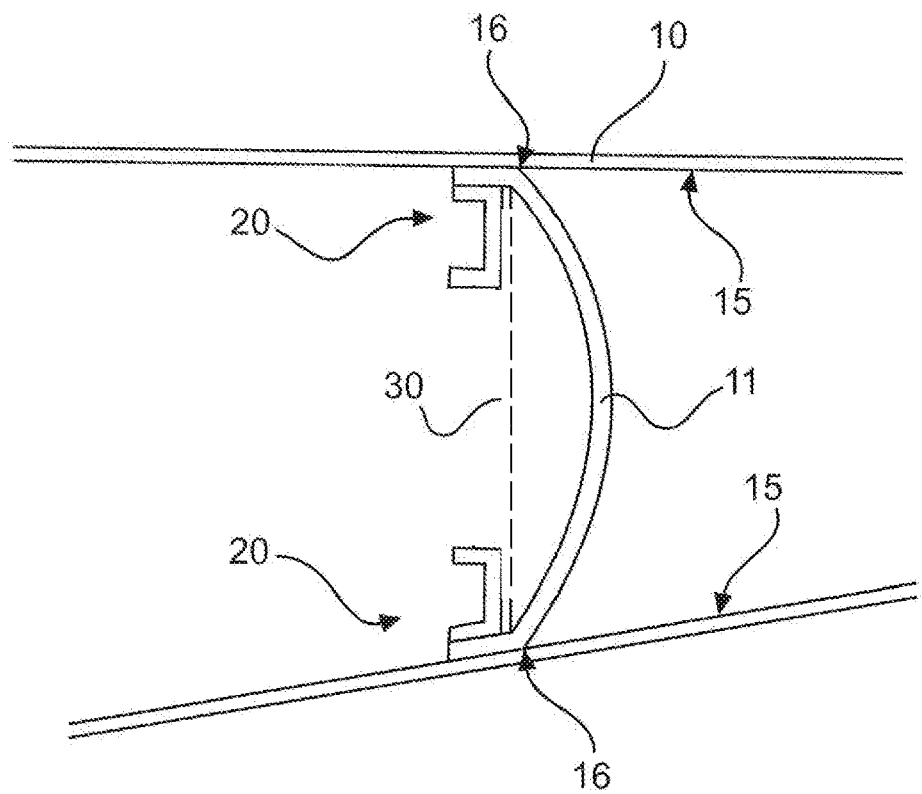
FIG. 5 shows a sectional view of a fuselage section and a pressure bulkhead according to another embodiment.
Figure 6:
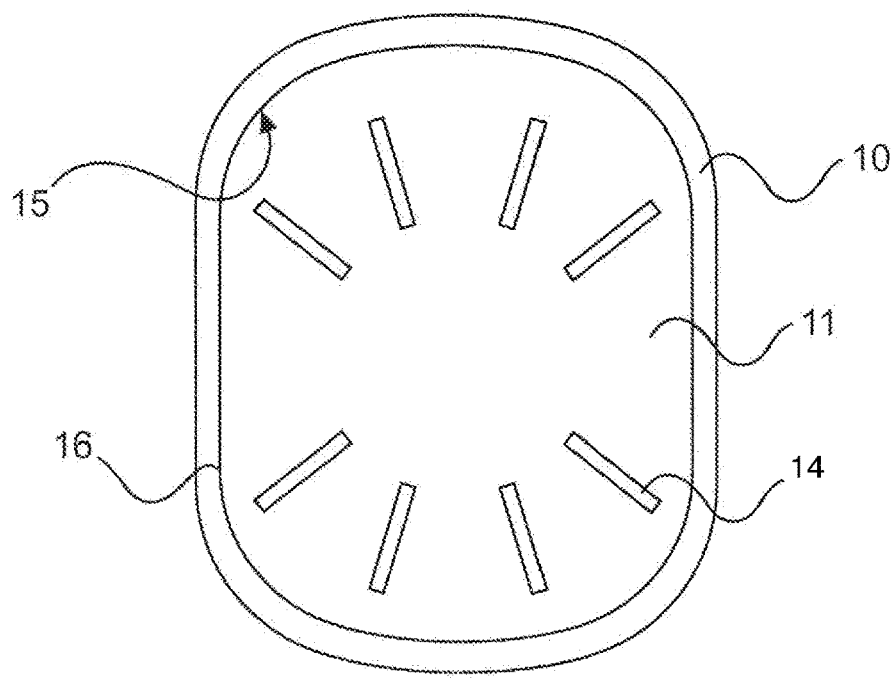
FIG. 6 shows a cross-sectional view of a fuselage section comprising a non-circular inner surface and a pressure bulkhead comprising a non-circular outer edge according to another embodiment.

FIG. 5 shows a sectional view of a fuselage section 10 and a pressure bulkhead 11 wherein both the outer edge 16 of the pressure bulkhead 11 and the inner surface 15 of the fuselage section 10 are non-circular with respect to a cross-sectional view, as shown in FIG. 6. In FIG. 5, the pressure bulkhead, e.g. the outer edge 16 of the pressure bulkhead is not only aligned with the inner surface 15 of the fuselage section 10, but also is in contact with the inner surface 15 of the fuselage section 10. In this configuration, there is no gap or distance between the outer edge 16 of the pressure bulkhead 11 and the inner surface 15 of the fuselage section 10. In other words, the pressure bulkhead 11 may directly be attached to the inner surface 15 of the fuselage section 10 such that no profile 21 or flanges 21a, 21b (as shown in FIG. 2) are necessary to connect the pressure bulkhead 11 to the fuselage section 10. The pressure bulkhead 11 with a non-circular outer edge 16 is in contact with a non-circular inner surface 15 of the fuselage section 10 because there is no gap between both parts. The pressure bulkhead 11 is therefore manufactured such that the pressure bulkhead 11 exactly fits into the fuselage section 10 at a certain location. This means that the outer edge 16 of the pressure bulkhead 11 touches the non-circular inner surface 15 of the fuselage section 10 at every point along the curve 30 which is also located directly on the surface 15 of the fuselage section 10.

FIG. 6 shows a cross-sectional view of the pressure bulkhead 11 shown in FIG. 5. Therein, the pressure bulkhead 11 directly fits into the fuselage section 10. In other words, the outer edge 16 of the pressure bulkhead 11 which is non-circular in the cross-sectional view contacts the non-circular inner surface 15 of the fuselage section.

However, FIG. 6 shows another configuration of the pressure bulkhead 11 shown in FIG. 1. The difference is that FIG. 1 shows a pressure bulkhead 11 that is adapted to the non-circular contour of the inner surface 15 of the fuselage section 10 but still provides a gap 12 with a certain distance 13 which is preferably constant over the whole inner surface 15 of the fuselage section 10 along which the outer edge 16 of the pressure bulkhead extends. In contrast, FIG. 6 shows configuration where there is no gap 12 between the outer edge 16 of the pressure bulkhead 11 and the non-circular inner surface 15 of the fuselage section 10. In FIG. 6, the pressure bulkhead 11 is adapted such that there is no further part needed to provide a connection between the outer edge 16 of the pressure bulkhead 11 to the inner surface 15 of the fuselage section 10. However, the pressure bulkhead 11 shown in FIG. 1 may require profile 21 in order to close the gap, wherein the profile 21 may comprise a constant cross section when extending along the outer edge 16 or along the curve 30 of the inner surface 15. The pressure bulkhead 11 (depicted in FIG. 1, FIG. 2, FIG. 4, FIG. 5, and FIG. 6) is therefore not spherical but rather provides a pressure optimized form which still allows transmitting the loads due to the pressure difference between the pressurized cabin and the non-pressurized outer area of the fuselage section 10. For example, the embodiment of the pressure bulkhead 11 depicted in FIG. 4 comprises the spherical component 11b as shown in FIG. 4, but also provides a shell-like structural component 11a providing a means for connecting the spherical component 11b to the inner surface 15 of the fuselage section 10, wherein the shell-like structural component 11a may comprise an irregular shape.

Figure 7:
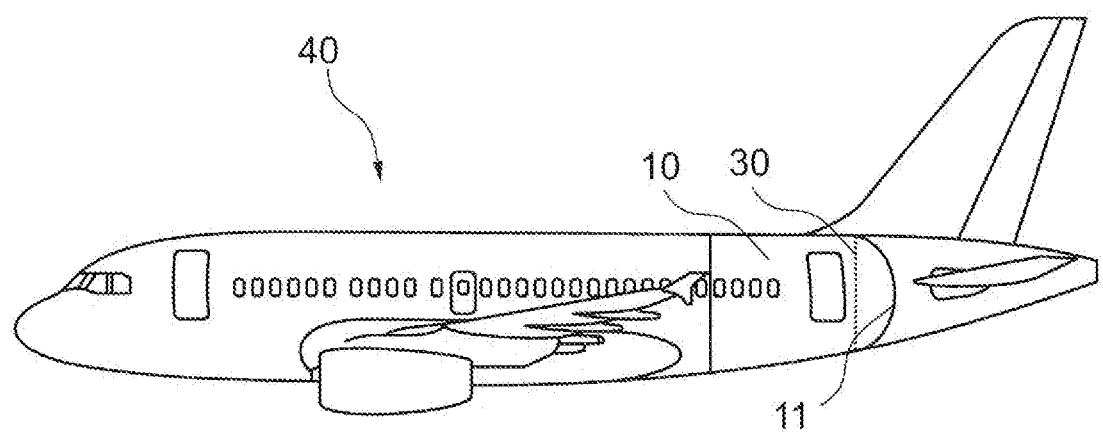
FIG. 7 shows an aircraft comprising a fuselage section according to an embodiment.

FIG. 7 shows an aircraft 40 comprising a fuselage section 10 and a pressure bulkhead 11. The pressure bulkhead 11 may be a rear pressure bulkhead of the aircraft 40. The rear pressure bulkhead is adapted to separate a pressurized cabin area and a non-pressurized outer area of the fuselage section 10. FIG. 7 further shows the curve 30 along which the outer edge 16 of the pressure bulkhead 11 extends, e.g. the outer edge 16 extends parallel to the curve 30. The curve 30 may extend on the inner surface 15 of the fuselage section 10, wherein the inner surface 15 may have a non-circular contour with respect to a cross sectional view of the fuselage section 10 or the aircraft 40.

Figure 8:
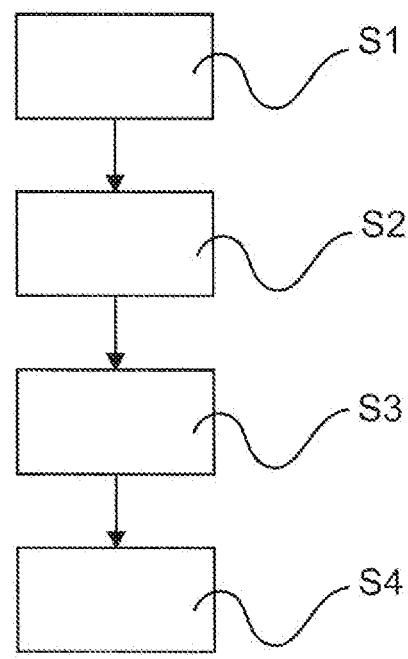
FIG. 8 shows a flow diagram of a method for manufacturing a fuselage section according to an embodiment.

FIG. 8 is a flow diagram of a method for manufacturing a fuselage section 10. In a first step S1 of the method, an inner surface 15 with a non-circular contour of the fuselage section 10 is provided. The non-circular contour may be described by a curve 30 shown in FIGS. 2, 3 and 5. In another step S2 of the method, a pressure bulkhead 11 comprising a non-circular outer edge 16 is provided. The outer edge 16 may also be defined by a second curve extending parallel to the curve 30. In another step S3 of the method, the non-circular outer edge 16 of the pressure bulkhead 11 is aligned with the non-circular contour of the inner surface 15 of the fuselage section 10. In another step S4, the pressure bulkhead 11 is attached to the fuselage section 10.

While the embodiment has been illustrated and described in detail in the drawings and the foregoing description, such illustration and description are to be considered illustrative and exemplary and not restrictive; the embodiment is not limited to the disclosed embodiments. Other variations to the disclosed embodiments may be understood and effected by those skilled in the art, from a study of the drawings, the disclosure, and the appended claim. In the claims the term "comprising" does not exclude other elements, and the indefinite article "a" or "an" does not exclude a plurality. The mere fact that certain measures are recited in mutually different dependant claims does not indicate that a combination of these measures cannot be used to advantage. Any reference signs in the claims should not be construed as limiting the scope of protection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A fuselage section, comprising:
   an inner surface having a non-circular contour; and
   a one-piece pressure bulkhead attached to the inner surface, the pressure bulkhead comprising a spherically shaped inner section and a non-spherically shaped outer section having a non-circular outer edge, wherein the non-spherically shaped outer section circumscribes the spherically shaped inner section;
   wherein the spherically shaped inner section comprises stiffening units radially arranged with respect to a longitudinal axis of the fuselage section;
   wherein all of the stiffening units of the spherically shaped inner section completely reside therein, without extending into the non-spherically shaped outer section;
   wherein the non-spherically shaped outer section comprises additional stiffening units radially arranged with respect to the longitudinal axis of the fuselage section;
   wherein all of the additional stiffening units of the non-spherically shaped outer section completely reside therein, without extending into the spherically shaped inner section; and
   wherein the non-circular outer edge of the non-spherically shaped outer section is aligned with the non-circular contour of the inner surface of the fuselage section.

2. The fuselage section according to claim 1, wherein the inner surface of the fuselage section is aligned with the non-circular outer edge of the non-spherically shaped outer section of the pressure bulkhead such that a substantially constant distance between the inner surface of the fuselage section and the non-circular outer edge of the non-spherically shaped outer section of the pressure bulkhead is provided.

3. The fuselage section according to claim 1, further comprising:
   an attachment unit that attaches the pressure bulkhead to the inner surface of the fuselage section;
   wherein the attachment unit comprises a profile which extends on the inner surface of the fuselage section along a curve which is perpendicular to the longitudinal axis of the fuselage section.

4. The fuselage section according to claim 3, wherein the profile comprises a constant cross section along the curve.

5. The fuselage section according to claim 3, wherein the profile comprises a first flange being attached to the pressure bulkhead and a second flange being attached to the inner surface of the fuselage section.

6. The fuselage section according to claim 1, wherein the non-spherically shaped outer section of the pressure bulkhead is configured to attach the pressure bulkhead to the inner surface of the fuselage section.

7. The fuselage section according to claim 1, wherein the spherically shaped inner section and/or the non-spherically shaped outer section are manufactured from a material selected from a group, the group comprising a metal, a synthetic material or a composite material.

8. The fuselage section according to claim 1, wherein each of the stiffening units of the spherically shaped inner section is radially aligned with a respective one of the additional stiffening units of the non-spherically shaped outer section.

* * * * *